F. A. BOWER.
DIFFERENTIAL GEARING.
APPLICATION FILED DEC. 15, 1916.
1,226,854.
Patented May 22, 1917.
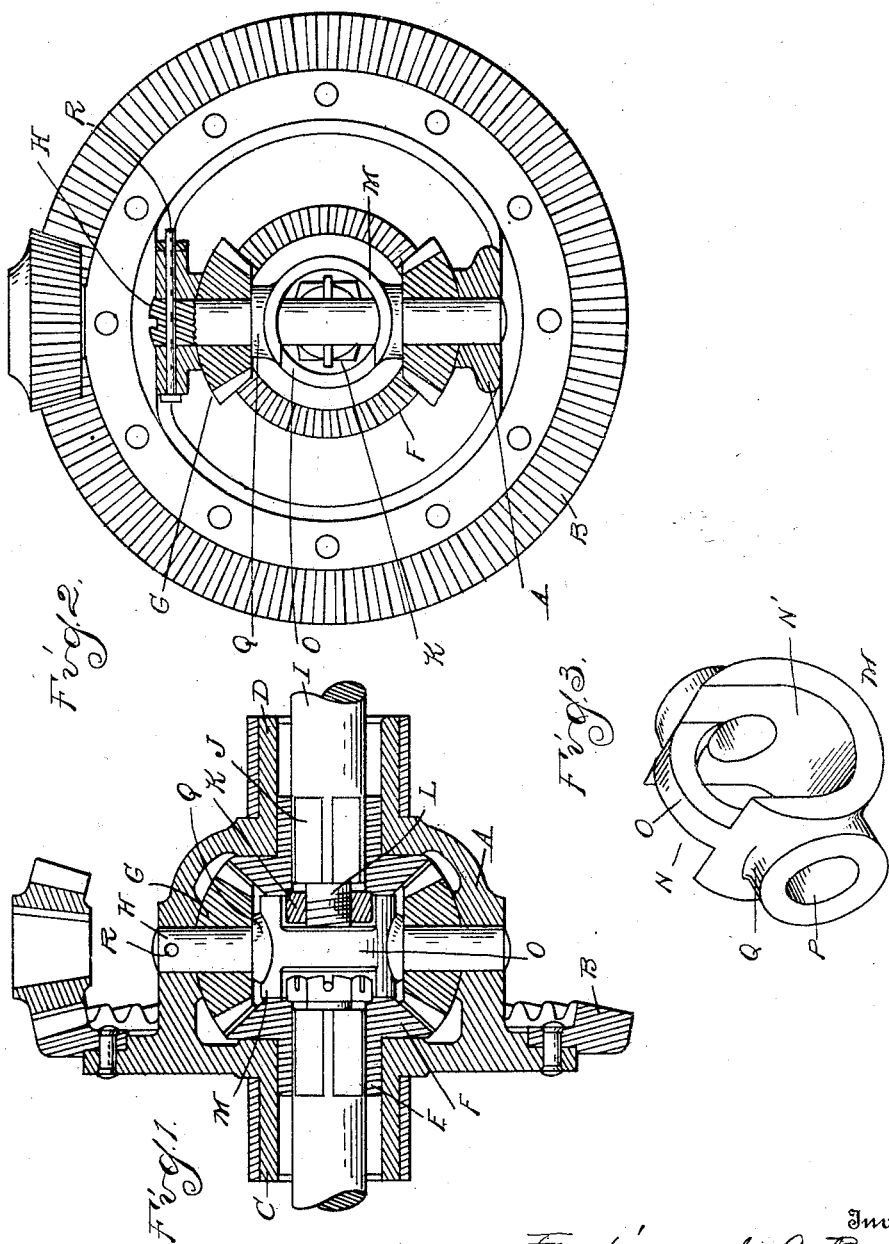
Inventor
Ferdinand A. Bower
By Whittemore Hulbert & Whittemore

UNITED STATES PATENT OFFICE.

FERDINAND A. BOWER, OF FLINT, MICHIGAN, ASSIGNOR TO GENERAL MOTORS COMPANY, OF DETROIT, MICHIGAN, A CORPORATION OF NEW JERSEY.

DIFFERENTIAL GEARING.

1,226,854.   Specification of Letters Patent.   Patented May 22, 1917.

Application filed December 15, 1916. Serial No. 137,216.

*To all whom it may concern:*

Be it known that I, FERDINAND A. BOWER, a citizen of the United States of America, residing at Flint, in the county of Genesee and State of Michigan, have invented certain new and useful Improvements in Differential Gearing, of which the following is a specification, reference being had therein to the accompanying drawings.

The invention relates to differential gearing such as employed in drive axle construction, and comprises the novel features as hereinafter set forth.

In the drawings:

Figure 1 is a longitudinal section through the differential gearing;

Fig. 2 is a sectional elevation in a plane at right angles to Fig. 1;

Fig. 3 is a perspective view of the spacer.

My invention has more particular reference to that type of differential gearing in which there are a plurality of pinions intermediate the gears on the axle shafts, said gears and pinions being mounted in an integral or one-piece casing or frame. With such construction the parts are assembled by first placing the gears in the casing and then relatively revolving the same to roll the pinions into proper position for engagement with their journal pins. It is one of the objects of the present invention to provide a spacer between the gears through which the wheel thrust on the axles may be transmitted from one gear to the other without throwing additional stress upon the gear-teeth. It is a further object to obtain a construction which may be laterally inserted between the gears without interference therewith or with the axle shafts, and which will also form a reinforcement for the pin on which the pinions are journaled.

In detail, A is the casing of the differential to which the ring-gear B is attached, said casing being provided with the opposite hub portions C and D, forming bearings for the hubs E of the gear-wheels F. The pinions G are arranged diametrically opposite each other between the gear-wheels F and are journaled upon a cross-pin H inserted endwise through alined apertures in the casing A and the pinions.

I are the axle-shafts, which are engaged with the gear-wheels F, preferably by polygonal end portions J thereof, and are secured by nuts K engaging threaded end portions L of said shafts.

With the construction as thus far described, the parts may be assembled by first placing the gears F within the casing, engaging the axle shafts therewith and securing the same by the nuts K, after which the pinions G may be rolled into registration with the apertures in the casing and the pin H inserted. With such a construction any end-thrust upon the shafts I due to the lateral thrust of the wheels will be transmitted directly to the teeth of the gears F and pinions G, thereby increasing the wear as well as frictional resistance. To avoid this objection, I have provided a spacer M which is insertible between the gears F and which is held in position by the cross-pin H. This spacer performs the further function of providing end-thrust bearings for the pinions and also forming a reinforcement for the pinion journal pin H, stiffening and strengthening the same. Inasmuch, however, as the nuts K project inward beyond the thrust bearing faces of the gear-wheels F, this would interfere with the insertion of a spacer, and I have avoided the difficulty by providing recesses in the opposite ends of the spacers having entrance slots permitting of lateral engagement with the nuts K. Thus, as shown, the spacer M is of annular form, being of sufficient internal diameter to receive the nuts K. On one side entrance slots N and N' are formed at opposite ends and intermediate these slots is a connecting wall O which completes the annulus. At right angles to the plane of the slots N and N' is a transverse bore P for receiving the pin H, and bosses Q surrounding this bore form bearings for abutting against the pinions G.

In assembling the parts after the gear-wheels F and pinions G have been placed within the casing A in the manner above described, the spacer M is laterally inserted, the nuts K entering the slots N and N' and the bore P alining with the bores of the pinions and casing A. The pin H may then be inserted endwise and when in position is locked by a cross-pin or T R extending through the bearing at one side of the casing A. In operation, end-thrust transmitted through the shafts I to the gear-wheels F will be carried through the spacer M and into the opposite gear-wheel which has an end-thrust bearing upon the casing. Also the pin H is held from lateral deflection by the support of the spacer M.

What I claim as my invention is:

1. In a differential gearing, the combination with axially-alined shafts, gear-wheels mounted thereon and pinions intermediate said gear-wheels, of a casing in which said gear-wheels and pinions are journaled, means for securing the shaft to the gear-wheel projecting inward beyond the latter, a spacer laterally insertible between said gear-wheels provided with an entrance slot for receiving the projecting securing means for one of said shafts, and a journal-pin for said pinions extending transversely through said space and locking the same in position.

2. In a differential gearing, the combination with alined shafts, gear-wheels thereon and pinions intermediate said gear-wheels, of a casing surrounding said gear-wheels and pinions, securing means for said shafts projecting inward beyond said gear-wheels, a spacer laterally insertible between said gear-wheels having entrance slots for receiving said shaft securing means, and provided with bearing faces abutting against the inner faces of said gear-wheels and pinions, and a pin forming a journal for said pinions insertible endwise through said casing, pinions and spacer and forming the securing means for the latter.

3. In a differential gearing, the combination with an integral case, gear-wheels laterally insertible within said case and into bearings thereon in axial alinement with each other, pinions adapted to be rolled between said gear-wheels into said case, a shaft insertible through one of the gear-wheels, having a threaded portion projecting beyond the inner face of said gear, a nut engaging said threaded portion for clamping said gear to said shaft, a spacer insertible between said gears, having an entrance slot for receiving said nut and provided with a transverse bore, and a pin forming the journal for said pinion insertible endwise through said case, pinions and transverse bore of said spacer to secure the latter in position.

4. In a differential gearing, the combination with a hollow casing and axially-alined bearings, of gear-wheels insertible laterally into said casing and into engagement with said bearings, pinions adapted to be rolled between said gear-wheels into said casing, a shaft engageable with a gear-wheel. means for securing said gear wheel to said shaft within said casing, a spacer insertible laterally between said gear-wheels, having an entrance slot for engaging said shaft-securing means and provided with a transverse bore, a pin insertible endwise through said casing, pinions and transverse bore in said spacer, and a pin or key for locking said pinion pin to said casing.

5. In a differential gearing, an integral casing for receiving the gears and the intermediate pinions, a transverse pin forming journals for said pinions, and a spacer between said gear-wheels comprising an annular member having thrust bearings at its opposite ends for said gear-wheels and a transverse bore, the wall of one side of said spacer being cut away to form entrance slots with a connecting central brace or tie for the purpose described.

6. In a differential gearing, a casing for receiving the gears and intermediate pinions, means for securing said gears upon their shafts and a spacer between said gears comprising a member having thrust bearings at its opposite ends therefor, the wall of one side of said spacer being cut away to form entrance slots for engaging said securing means.

In testimony whereof I affix my signature.

FERDINAND A. BOWER.